United States Patent
Beijbom et al.

[11] Patent Number: 5,837,910
[45] Date of Patent: Nov. 17, 1998

[54] METHOD AND A DEVICE FOR TWO-SHAFT FORCE MEASUREMENT AND ITS APPLICATION TO THE DETERMINATION OF TENSILE FORCE IN A CONTINUOUS WEB

[75] Inventors: Jan Beijbom; Jarl Sobel, both of Västerås, Sweden

[73] Assignee: Asea Brown Boveri AB, Västerås, Sweden

[21] Appl. No.: 836,107

[22] PCT Filed: Nov. 28, 1995

[86] PCT No.: PCT/SE95/01422

§ 371 Date: May 16, 1997

§ 102(e) Date: May 16, 1997

[87] PCT Pub. No.: WO96/17233

PCT Pub. Date: Jun. 6, 1996

[30] Foreign Application Priority Data

Nov. 29, 1994 [SE] Sweden .................................. 9404108

[51] Int. Cl.$^6$ ...................................................... G01L 5/10
[52] U.S. Cl. ..................................... 73/862.473; 73/862.46
[58] Field of Search .......................... 73/862.42, 862.451, 73/862.453, 862.46, 862.473, 862.474

[56] References Cited

U.S. PATENT DOCUMENTS

| 3,204,454 | 9/1965 | Friman et al. | 73/862.473 |
| 4,116,029 | 9/1978 | Fabian et al. | 73/862.474 |
| 4,171,640 | 10/1979 | Van Mastrigt | 73/862.451 |
| 4,548,085 | 10/1985 | Grundy | 73/862.473 |
| 5,275,062 | 1/1994 | Turley | 73/862.474 |

Primary Examiner—Max H. Noori
Attorney, Agent, or Firm—Watson Cole Grindle Watson, P.L.L.C.

[57] ABSTRACT

The present invention relates to a method and a device for two-shaft force measurement and its application to the determination of tensile force in a continuous web. The device comprises a force-introducing part (4) with two force-measuring parts A and B for determining the forces $F_A$ and $F_B$, and the force is applied in a torque-free manner around a center of force via a device (3), for example in the form of a deflector roll journalled in bearing brackets (3) placed on the force-introducing part, and wherein the force-measuring parts, due to their built-in design, measure forces $F_A$ and $F_B$ in directions directed through angles $\pm\phi$ from a mean measurement direction, and wherein the force-measuring parts A and B are placed at the same distance L on different sides of a plane parallel to the mean measurement direction and through said center of force, and wherein the force-measuring parts A and B are placed at a distance h on the same side of a plane perpendicular to the mean measurement direction and through said center of force (FIG. 2).

7 Claims, 1 Drawing Sheet

METHOD AND A DEVICE FOR TWO-SHAFT FORCE MEASUREMENT AND ITS APPLICATION TO THE DETERMINATION OF TENSILE FORCE IN A CONTINUOUS WEB

TECHNICAL FIELD

Within, inter alia, the paper, plastics, textile and metal industries, that is, where it is a question of producing paper, fabric of various kinds, and rolled products in the form of a continuous web, there is a considerable need to be able to measure tensile force and/or tensile stress in the continuous web in order to indicate, monitor and control the manufacturing process. The present invention is based on a device designed either as an integrated load cell with two single-shaft measuring force transducers, or as two single-shaft measuring load cells, which together measure the force on an object, for example a bearing bracket. To determine the tensile force in a continuous web, it is further assumed that the web runs over a deflector roll which is journalled on both sides in such a bearing bracket. The invention further comprises a method which, with the aid of the measured quantities and some known geometrical conditions, permits determination of the magnitude and direction of the total force, that is, permits carrying out a two-shaft force measurement. This is finally applied to the determination of the tensile force and/or the tensile stress in a continuous web where either the entry angle $\alpha$ or the exit angle $\beta$ of the continuous web is unknown.

BACKGROUND ART, THE PROBLEMS

One known principle of measuring tensile force and/or tensile stress in a continuous web is described in the ABB pamphlet Pillow Block Web Tensiometer, 3BSE 004327R0001. The measurement is normally performed such that the web is allowed to pass over a deflector roll, which at each shaft end is journalled in a bearing bracket which is mounted on a load cell. This, in turn, is fixed to a rigid base. The load cell consists of a load cell housing, generally referred to as Pillow Block, with one built-in transducer of preferably magnetoelastic type. The load cell housing is designed such that, if the load cell only measures the force which is oriented in the longitudinal direction of the load cell and parallel to the mounting surface. This type of load cell is normally mounted on a horizontal surface and is usually referred to as a horizontal-measuring load cell since it is sensitive to forces in the horizontal direction thereof.

There are also vertical-measuring load cells of the Pillow Block type, which, among other things, is clear from the KELK pamphlet "MONOBLOC", MST-BR-696. This measures only the force which is perpendicular to the mounting surface. This type of load cell normally has at least two built-in transducers in order thus to stabilize the construction.

There are also torque-measuring load cells of the Pillow Block type which measure the torque which arises over the load cell and the bearing bracket. This type of load cell has one built-in transducer and measures all the forces which are not directed through the torque point of the transducer. To calculate the tensile force and/or the tensile stress in the web, the position of the axial point at the deflector in relation to the position of the torque point of the load cell must be known. Such a load cell is clear from, among other things, the KELK pamphlet "Tensiometers for Rolling Mills".

To be able to calculate the tensile force and/or the tensile stress in a web with any of the types of load cells described above, it is, in addition, necessary to have knowledge of the entry angle $\alpha$ and the exit angle $\beta$ of the web relative to a horizontal plane.

In certain rolling processes, however, especially in connection with coiling, one of the deflection angles will vary concurrently with the diameter of the coil, either decreasing or increasing depending on whether it is a question of winding off or winding up.

To be able to measure the tensile force with the above-mentioned load cells under these circumstances, the force measurement must be supplemented with a measurement of the variable angle, which is both costly and, in certain cases, unreliable.

In this case, and in several other contexts, it is desirable to be able to measure, in one and the same load cell, both the horizontal and the vertical force component of a given force, that is, carry out a two-shaft measurement of the force. Designing such a load cell by combining the horizontal-measuring load cell described above with a vertical-measuring load cell would, however, entail a design with several disadvantages.

The load cell then must comprise at least three force transducers which will result in a complicated design. For reasons of space, it is desirable for these load cells to be as low as possible. A design with at least three transducers will, however, of necessity be relatively high. In addition, a load cell with horizontal-measuring transducers must of necessity be made weaker in the horizontal direction than a load cell with only vertical-measuring transducers. This is a considerable disadvantage when the load cell is installed in a processing line in which stiff attachments are necessary.

Determining tensile force and/or tensile stress in a web in case of a device with two built-in transducers, either as two vertical-measuring transducers or two horizontal-measuring transducers, comprises simple mechanics and corresponds to the technique used when only one transducer is used. The determination according to the prior art will be clear from the following description. FIG. 1 shows a device with two vertical-measuring transducers.

It is assumed that the web 1 in which it is desired to measure tensile force $F_D$ and/or tensile stress runs over a deflector roll 2 mounted between two bearing brackets 3 which are each placed on a separate load cell 4.

The load cell is arranged with two identical vertical force-measuring transducers A and B, which are each placed on one side of, and at one and the same distance L away from, a vertical plane through the centre line of the shaft of the bearing bracket and the centres of which are located at the same vertical distance h away from a horizontal plane through the centre line of the bearing bracket.

The deflector roll is assumed to be journalled in such a way in the bearing brackets that the friction, when the deflector roll rotates with the strip, gives rise to a negligible torque.

When the deflector roll is subjected to a load caused by the continuous web, the total force will be distributed between the two load cells. If the web tension across the web is uneven, the force on the load cells will be different. In systems where the web tension may be assumed to be evenly distributed over the strip, it is thus, in principle, sufficient to measure the forces at one side of the roll. In systems where greater accuracy and reliability are required, force measurement at both ends of the roll is needed.

When loading the deflector roll, the force transducers A and B will measure the forces $F_A$ and $F_B$, respectively. The total vertical force on a load cell is thus, with known and conventional technique, as follows $$F_v = F_A + F_B \tag{1}$$

With knowledge of the entry angle α and the exit angle β of the web relative to a horizontal plane, the tensile force in the web may thus be determined in conventional manner (see, e.g., equation 12).

SUMMARY OF THE INVENTION

The invention comprises a new method for determining tensile force in a web which, at an entry angle and an exit angle, hereinafter referred to as deflection angles, runs over a deflector roll. The method presupposes a measurement device with either two vertical-measuring force transducers, two horizontal-measuring force transducers, or, according to the invention, with two fore transducers which measure the force at an angle in relation to the vertical measurement direction. The determination is based on a decomposition of the tensile force into two components disposed perpendicularly to each other and will be referred to hereinafter as "two-shaft measurement of a force".

The determination of the tensile force according to the prior art assumes access to both deflection angles. The invention permits a possibility of determining the tensile force in the web with knowledge of only one of the deflection angles.

When the material, after passage of the deflector roll, is lead to a reel, one of the deflection angles will be continuously changed. The invention permits a possibility of continuously determining the varying deflection angle.

The invention also comprises a device for force measurement at an angle in relation to the vertical direction.

Figure 1:
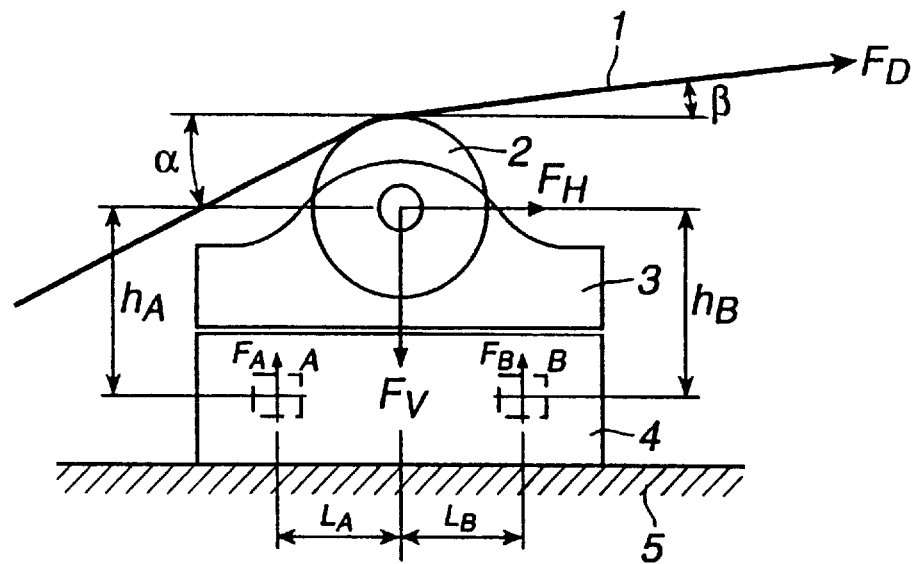
FIG. 1 shows an embodiment of a load cell with symmetrically located vertical-measuring force transducers according to conventional technique (prior art).

Starting from FIG. 1, as described above the vertical force on the load cell is $$F_v = F_A + F_B \tag{1}$$

The method according to the invention now comprises achieving, with the transducers A and B, a two-shaft measurement of the force which influences the load cell by determining the horizontal force $F_H$ which influences each load cell, and by determining the tensile force $F_D$ in the web with the aid of $F_V$ and $F_H$.

The horizontal force component $F_H$ which arises when the web runs over the deflector roll gives rise to a torque on the load cell. Assuming that the transducer A measures the force by which the web influences the deflector roll and the bearing bracket on the entrance side, and that the transducer B measures the force by which the web influences the deflector roll and the bearing bracket on the exit side, the resultant horizontal force $F_H$ from the web will develop a torque on the load cell housing equal to $$F_H \cdot h = F_B \cdot L - F_A \cdot L \tag{2}$$

that is, $$F_H = (F_B - F_A)\frac{L}{h} \tag{3}$$

Since the deflector roll is journalled in the bearing bracket in a torque-free manner, the addition to the torque equation (2) above, which is a consequence of the force application point really being at a distance equal to the radius of the deflector roll from the centre of the deflector roll, will be equal to zero.

From a general point of view, the transducers need not, of course, be placed in such a symmetrical way as has been described above. In an alternative embodiment, the transducers may be located at different distances $L_A$ and $L_B$, respectively, from a vertical plane through the centre line of the shaft of the deflector roll and at different distances $h_A$ and $h_B$, respectively, from the horizontal plane through the centre line of the deflector roll.

This leads to more complicated calculations, but the system is still capable of being solved provided that the force-introducing and supporting parts are much stiffer than the transducers, which practically always is fulfilled. In addition, it is required that the temperature in the force-introducing and supporting parts be the same.

If the difference between the distances $h_A$ and $h_B$ is small, the horizontal force $F_H$ will, with a very good approximation, be equal to $$F_H = \frac{2(F_B L_B - F_A L_A)}{(h_A + h_B)} \tag{4}$$

A method for determining the tensile force in a web according to the invention may also be used if the measurement device comprises two horizontal-measuring force transducers. These transducers must then be placed on different sides of a horizontal plane through the centre line of the shaft of the deflector roll and their centres may not lie in a vertical plane through the centre line of the shaft of the deflector roll.

In general terms, it may be said that the force component of the tensile force in the web which is directed in the common measurement direction of the force transducers is determined according to $$F_M = F_A + F_B \tag{5}$$

According to the method of the invention, the force component of the tensile force which is directed perpendicular to the measurement direction of the force transducers may be determined according to $$F_{VM} = \frac{2(F_B L_B - F_A L_A)}{(h_A + h_B)} \tag{6}$$

The distances $L_A$, $L_A$, $h_A$ and $h_B$, respectively, are defined in this general case by the fact that the force-measuring parts A and B are placed at the distance $L_A$ and $L_B$, respectively, on separate sides of a plane parallel to the measurement direction, through the centre of the deflector roll, and at the distance $h_A$ and $h_B$, respectively, on the same side of a plane perpendicular to the measurement direction, through the centre of the deflector roll.

From a general point of view, a device to which the method according to the invention is applicable may comprise two force transducers which measure the force at an angle in relation to the vertical direction. The transducers are assumed to be placed on different sides of a vertical plane through the centre line of the shaft of the deflector roll and at a distance from the horizontal plane through the centre line of the deflector roll.

Figure 2:
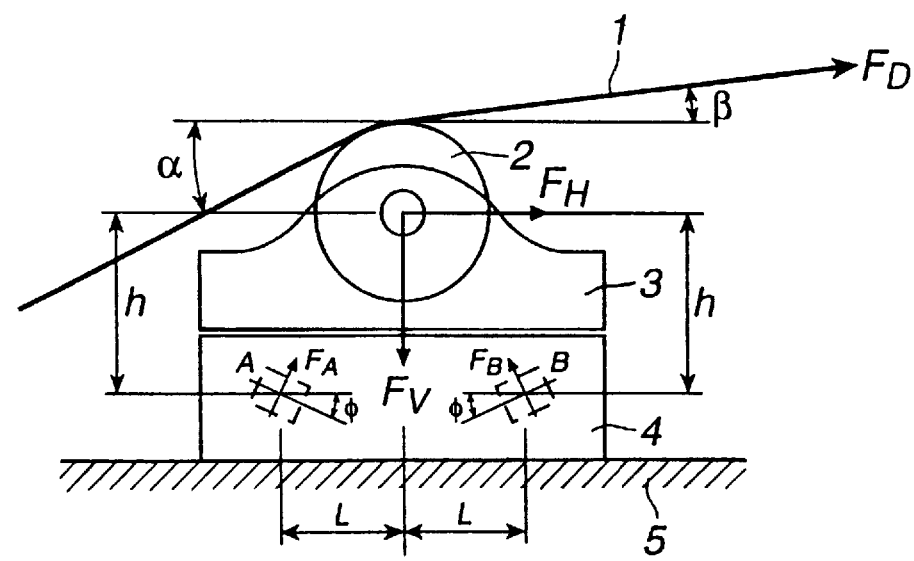
FIG. 2 shows a preferred embodiment of a load cell according to the invention, with symmetrically located force transducers measuring the force at an angle relative to the vertical direction.

FIG. 2 shows a symmetrical case, in which the transducers are located at the same distance L from the vertical plane through the centre line of the shaft of the deflector roll and at the same distance h from the horizontal plane through the centre line of the deflector roll, and in which the force transducers measure the force in a direction deflected at an angle $\pm\phi$ to a vertical plane through the centre line of the shaft of the deflector roll.

In this case, the vertical force may be calculated as $$F_V = \frac{F_A + F_B}{\cos\phi} \quad (7)$$

The horizontal force becomes equal to $$F_H = \frac{(F_B - F_A)L}{(h\cos\phi + L\sin\phi)} \quad (8)$$

If, parallel to the above reasoning concerning the measurement direction at two vertical-measuring and two horizontal-measuring transducers, respectively, the force component $F_{MM}$ in a mean measurement direction in the vertical plane through the centre line of the shaft of the deflector roll and the force component in a direction perpendicular thereto are defined as $F_{VMMM}$, it is possible, as mentioned above, in a general case to determine that component of the tensile force in the web which is directed in the mean measurement direction of the force transducers according to $$F_{MM} = \frac{F_A + F_B}{\cos\phi} \quad (9)$$

and that component of the tensile force in the web which is directed perpendicular to the mean measurement direction may be correspondingly determined as $$F_{VMM} = \frac{(F_B - F_A)L}{(h\cos\phi + L\sin\phi)} \quad (10)$$

In those cases where the measurement direction is deflected at a certain angle, the scope of the invention also comprises embodiments where the transducers may be located at different L and h distances.

Measuring forces at an angle to the mean measurement direction may be advantageous to minimize the transverse force, that is, that force component which is directed perpendicular to the force component measured by each one of the transducers. High transverse forces on transducers deteriorate the accuracy of the measurement and should, therefore, be avoided.

Normally, large transverse forces are avoided by deflecting the load cell at such an angle that the measurement direction or the mean measurement direction coincides with the direction of the mean value of the total force which influences the deflector roll.

If the force component perpendicular to this direction varies greatly and if the distance between the force transducer and the deflector roll is large, that is, if the maximum value of $F_{VMMM}/F_{MM}$ is larger than L/h, the transverse force may be minimized by selecting the above angle $\phi$ according to $$\phi = \arctan\left(\frac{L}{h}\right) \quad (11)$$

To calculate the tensile force $F_D$ in the web at each bearing bracket when vertical-measuring or horizontal-measuring transducers are used, information is needed as to the deflection angles $\alpha$ and $\beta$ of the web relative to a plane perpendicular to the measurement direction of the force transducers. The tensile force is then determined according to $$F_D(\sin\alpha - \sin\beta) = F_M \quad (12)$$

Assuming a transducer with measurement directions deflected at a certain angle, according to the invention, the same equation is obtained for the tensile force when $F_M$ is replaced by $F_{MM}$, that is, $$F_D(\sin\alpha - \sin\beta) = F_{MM} \quad (12a)$$

Assuming equilibrium of forces perpendicular to the measurement direction of the force transducers, however, an additional equation may be obtained $$F_D(\cos\alpha - \cos\beta) = F_{VMM} \quad (13)$$

If the force perpendicular to the measurement direction is now known, the equations (12a) and (13) constitute an equation system. As mentioned above, in installations comprising coils, one of the deflection angles will vary. By combining these equations and starting from that of the deflection angles which is constant, the tensile force may be determined independently of the varying deflection angle.

If the angle $\beta$ is the unknown angle, the following is obtained:

$$F_D = \frac{-(F_{MM}^2 + F_{VMM}^2)}{2(F_{VMM}\cos\alpha - F_{MM}\sin\alpha)} \quad (14)$$

If the angle $\alpha$ is the unknown angle, this is obtained:

$$F_D = \frac{(F_{MM}^2 + F_{VMM}^2)}{2(F_{VMM}\cos\beta + F_{MM}\sin\beta)} \quad (15)$$

When the measurement direction of the force transducers is vertical or horizontal, the same equations apply to $F_D$ when $F_{MM}$ is replaced by $F_M$ and when $F_{VMM}$ is replaced by $F_{VM}$ according to the equations (5) and (6).

The total tensile force from the strip is obtained by summing the contributions from the two load cells on separate sides of the deflector roll.

In addition, the variable deflection angle at each bearing bracket may be determined, and hence information be obtained as to how far the coiling has proceeded. It is also possible in this way to detect and warn if the coiling is performed unevenly.

If the angle $\beta$ is the unknown one, the following is obtained $$\sin\beta = \frac{2F_{MM}F_{VMM}\cos\alpha - F_{MM}^2\sin\alpha + F_{VMM}^2\sin\alpha}{F_{MM}^2 + F_{VMM}^2} \quad (16)$$

If the angle $\alpha$ is the unknown one, the following is instead obtained:

$$\sin\alpha = \frac{2F_{MM}F_{VMM}\cos\beta - F_{MM}^2\sin\beta + F_{VMM}^2\sin\beta}{F_{MM}^2 + F_{VMM}^2} \quad (17)$$

When the measurement direction of the force transducers is vertical or horizontal, the same equations apply when $F_{MM}$ is replaced by $F_M$ and when $F_{VMM}$ is replaced by $F_{VM}$ according to equations (5) and (6).

Alternatively, by comparing the calculated deflection angles at each bearing bracket, it is possible to indicate and warn of high friction in one of the bearing brackets.

A device and a method according to the invention thus has considerable advantages relative to known devices for determining the tensile force in a continuous web where one of the deflection angles is unknown.

Finally, there is no requirement that the force transducers which have been described above are integrated in one and the same load cell. The method according to the invention may also be applied to a situation when, with the aid of two different load cells, placed in the same way as the force transducers above, the forces obtained from a bearing bracket are measured.

DESCRIPTION OF THE PREFERRED EMBODIMENTS

An embodiment of a device according to the invention will be clear from FIG. 2. A web 1 runs over a deflector roll 2, one side of which is journalled in a bearing bracket 3. The other side is journalled in a corresponding bearing bracket. The deflector roll is assumed to be journalled in such a way in the bearing brackets that the friction when the deflector roll rotates with the strip gives rise to a negligible torque. During operation, the shaft of the deflector roll is influenced by the vertical force $F_V$ and the horizontal force $F_H$. Each bearing bracket is fixed to a load cell which comprises a force-introducing part in the form of a load cell housing 4 and the force transducers A and B which are deflected at an angle so as to measure the forces $F_A$ and $F_B$, respectively, at an angle φ to the vertical line. The load cell housing, in turn, is fixed to a base 5. The entry angle α and the exit angle β of the deflector roll relative to a horizontal plane are also indicated on the figure.

The centres of the transducers A and B are located on respective sides of a vertical plane through a centre line of the shaft of the deflector roll. From a general point of view, the distance from this plane to the centre of transducer A is $L_A$, and the distance from this plane to the centre of transducer B is $L_B$. The centre of transducer A is, in addition, from a general point of view, located at a vertical distance $h_A$ from a horizontal plane through a centre line of the shaft of the deflector roll, and the centre of transducer B is located at a vertical distance $h_B$ from the same horizontal plane. In the accompanying figure, however, the horizontal distances $L_A$ and $L_B$ are drawn such that $L_A = L_B = L$ and the vertical distances $h_A$ and $h_B$ are drawn such that $h_A = h_B = h$.

The software and the algorithms which are needed to calculate the tensile force $F_D$ occurring in the web and the corresponding mechanical stress according to the equations included in the description of the invention are nowadays part of the conventional technique and will not, therefore, be described here.

As described above under "Background Art", the transducers are preferably of magnetoelastic type. The description of the invention is, therefore, drafted based on this assumption. Within the scope of the invention it is, of course, possible to use transducers based on other measurement principles, for example strain gauges etc., which measure the same forces as the transducers shown in the figure.

We claim:

1. A device for two-shaft measurement of a force comprising: a force-introducing part (4) with two force-measuring parts A and B for determining forces $F_A$ and $F_B$, the force being applied in a torque-free manner around a centre of force via a deflector roll (2) journalled in bearing brackets (3) placed on the force-introducing part, and wherein the force-measuring parts, due to their built-in design, measure forces $F_A$ and $F_B$ in directions directed through angles ±φ from a mean measurement direction midway between measurement directions +φ and −φ with φ being different from zero, wherein the force-measuring parts A and B are placed at a distance L on different sides of a plane parallel to the mean measurement direction and through said centre of force, wherein the force-measuring parts A and B are placed at a distance h on the same side of a plane perpendicular to the mean measurement direction and through said centre of force, and wherein the maximum value of the quotient between a force $F_{VMM}$ perpendicular to the mean measurement direction and a force $F_{MM}$ along the mean measurement direction is greater than L/h, the angle φ satisfying the relationship $$\phi = \arctan\left(\frac{L}{h}\right).$$

2. A method for determining a varying deflection angle (α, β) relative to a horizontal plane which arises in a web (1) when the web passes over a deflector roll (2) when winding with the aid of a device for two-shaft measurement of the tensile force in the web which comprises a force-introducing part (4) with two force-measuring parts A and B for determining forces $F_A$ and $F_B$, the force being applied in a torque-free manner around a centre of force via the deflector roll (2) journalled in bearing brackets (3) placed on the force-introducing part, and wherein the force-measuring parts, due to their built-in design, measure forces $F_A$ and $F_B$ in vertical or horizontal measurement directions, and wherein, in case of a vertical measurement direction, the force-measuring parts A and B are placed at a distance $L_A$ and $L_B$, respectively, on different sides of a plane parallel to the vertical measurement direction and through said centre of force, and wherein the force-measuring parts A and B are placed at a distance $h_A$ and $h_B$, respectively, on the same side of a plane perpendicular to the measurement direction and through said centre of force, and wherein, in case of a horizontal measurement direction, the force-measuring parts A and B are placed at the distances $L_A$ and $L_B$, respectively, on the same side of a vertical plane through said centre of force, and wherein the force-measuring parts A and B are placed at distances $h_A$ and $h_B$, respectively, on different sides of a plane parallel to the measurement direction and through said centre of force, said method comprising calculating the varying deflection angle based on the force in mean measurement direction $F_{MM}$ and its perpendicular component $F_{VMM}$ according to $$\sin\beta = \frac{2F_M F_{VM}\cos\beta - F_M^2 \sin\alpha + F_{VM}^2 \sin\alpha}{F_M^2 + F_{VM}^2} \quad (16)$$

if the angle α is constant and known, or according to $$\sin\alpha = \frac{2F_M F_{VM}\cos\beta - F_M^2 \sin\beta + F_{VM}^2 \sin\beta}{F_M^2 + F_{VM}^2} \quad (17)$$

if the angle β is constant and known.

3. A method for two-shaft measurement of a force when using a device comprising a force-introducing part (4) with two force-measuring parts A and B for determining forces $F_A$ and $F_B$, the force being applied in a torque-free manner around a centre of force via a deflector roll (2) journalled in bearing brackets (3) placed on the force-introducing part, and wherein the force-measuring parts, due to their built-in design, measure forces $F_A$ and $F_B$ in directions directed through angles ±φ from a mean measurement direction midway between the measurement directions +φ and −φ with φ being different from zero, and wherein the force-measuring parts A and B are placed at a distance L on different sides of a plane perpendicular to the mean measurement direction and through the centre of force, and wherein the force-measuring parts A and B are placed at a distance h on the same side of a plane perpendicular to the mean measurement direction and through said centre of force, said method comprising determining a force component $F_{MM}$ of the force which is directed in the mean measurement direction according to $$F_{MM} = \frac{F_A + F_B}{\cos\phi} \quad (9)$$

and determining the force component $F_{VMM}$ which is directed perpendicular to the mean measurement direction $F_{VMM}$ according to $$F_{VMM} = \frac{(F_B - F_A)L}{(h\cos\phi + L\sin\phi)} \quad (10)$$

4. A method for determining the tensile force FD in a web with the aid of a device for two-shaft measurement of a force wherein the device comprises a force-introducing part (4) with two force-measuring parts A and B for determining forces $F_A$ and $F_B$, the force being applied in a torque-free manner around a centre of force via a deflector roll (2) journalled in bearing brackets (3) placed on the force-introducing part, and wherein the force-measuring parts, due to their built-in design, measure forces $F_A$ and $F_B$ in directions directed through angles $\pm\phi$ from a mean measurement direction midway between the measurement directions $+\phi$ and $-\phi$ with $\phi$ being different from zero, and wherein the force-measuring parts A and B are placed at a distance L on different sides of a plane parallel to the mean measurement direction and through said centre of force, and wherein the force-measuring parts A and B are placed at a distance h on the same side of a plane perpendicular to the mean measurement direction and through said centre of force, and wherein the web runs over the deflector roll at an entry angle $\alpha$ and an exit angle $\beta$ relative to a plane perpendicular to the mean measurement direction, and wherein one of the deflection angles of the web is unknown, said method comprising calculating the tensile force $F_D$ based on a force $F_{MM}$ in the mean measurement direction and its perpendicular component $F_{VMM}$ according to $$F_D = \frac{-(F_{MM}^2 + F_{VMM}^2)}{2(F_{VMM}\cos\alpha - F_{MM}\sin\alpha)} \quad (14)$$

if the angle $\beta$ is the unknown one, or according to $$F_D = \frac{(F_{MM}^2 + F_{VMM}^2)}{2(F_{VMM}\cos\beta - F_{MM}\sin\beta)} \quad (15)$$

if the angle $\alpha$ is the unknown one.

5. A method for determining the varying deflection angle ($\alpha$, $\beta$) relative to a horizontal plane which arises in a web (1) when the web passes over a deflector roll (2) when winding with the aid of a device for two-shaft measurement of the tensile force in the web and wherein the device comprises a force-introducing part (4) with two force-measuring parts A and B for determining forces $F_A$ and $F_B$, the force being applied in a torque-free manner around a centre of force via a device, for example in the form of a deflector roll (2) journalled in bearing brackets (3) placed on the force-introducing part, and wherein the force-measuring parts, due to their built-in design, measure forces $F_A$ and $F_B$ in directions directed through angles $\pm\phi$ from a mean measurement direction midway between the measurement directions $+\phi$ and $-\phi$ with $\phi$ being different from zero, and wherein the force-measuring parts A and B are placed at a distance L on different sides of a plane parallel to the mean measurement direction and through said centre of force, and wherein the force-measuring parts A and B are placed at a distance h on the same side of a plane perpendicular to the mean measurement direction and through said centre of force, said method comprising calculating the varying deflection angle based on the force in the mean measurement direction $F_{MM}$ and its perpendicular component $F_{VMM}$ according to $$\sin\beta = \frac{2F_{MM}F_{VMM}\cos\alpha - F_{MM}^2\sin\alpha + F_{VMM}^2\sin\alpha}{F_{MM}^2 + F_{VMM}^2} \quad (16)$$

if the angle $\alpha$ is constant and known, or according to $$\sin\alpha = \frac{2F_{MM}F_{VMM}\cos\beta - F_{MM}^2\sin\beta + F_{VMM}^2\sin\beta}{F_{MM}^2 + F_{VMM}^2} \quad (17)$$

if the angle $\beta$ is constant and known.

6. A method for two-shaft measurement of a force when using a device comprising a force-introducing part (4) with two force-measuring parts A and B for determining forces $F_A$ and $F_B$, the force being applied in a torque-free manner around a centre of force via a deflector roll (2) journalled in bearing brackets (3) placed on the force-introducing part, and wherein the force-measuring parts, due to their built-in design, measure forces $F_A$ and $F_B$ in vertical or horizontal measurement directions, and wherein, in case of a vertical measurement direction, the force-measuring parts A and B are placed at the distance $L_A$ and $L_B$, respectively, on different sides of a plane parallel to the vertical measurement and through said centre of force, and wherein the force-measuring parts A and B are placed at the distances $h_A$ and $h_B$, respectively, on the same side of a plane perpendicular to the measurement direction and through said centre of force, and wherein, in case of a horizontal measurement direction, the force-measuring parts A and B are placed at the distances $L_A$ and $L_B$, respectively, on the same side of a vertical plane and through said centre of force, and wherein the force-measuring parts A and B are placed at the distances $h_A$ and $h_B$, respectively, on different sides of a plane parallel to the measurement direction and through said centre of force, said method comprising determining a force component $F_M$ of the tensile force which is directed in the measurement direction according to $$F_M = F_A + F_B \quad (5)$$

and determining force component $F_{VM}$ of the tensile force which is directed perpendicular to the measurement direction according to $$F_{VM} = \frac{2(F_B L_B - F_A L_A)}{(h_A + h_B)} \quad (6)$$

7. A method for determining a tensile force $F_D$ in a web (1) with the aid of a device for two-shaft measurement of a force which comprises a force-introducing part (4) with two force-measuring parts A and B for determining the forces $F_A$ and $F_B$, the force being applied in a torque-free manner around a centre of force via a deflector roll (2) journalled in bearing brackets (3) placed on the force-introducing part, and wherein the force-measuring parts, due to their built-in design, measure forces $F_A$ and $F_B$ in vertical or horizontal directions, measurement directions, and wherein, in case of a vertical measurement direction, the force-measuring parts A and B are placed at the distances $L_A$ and $L_B$, respectively, on different sides of a plane parallel to the vertical measurement direction and through said centre of force, and wherein the force-measuring parts A and B are placed at the distances $h_A$ and $h_B$, respectively, on the same side of a plane perpendicular to the measurement direction and through said centre of force, and wherein, in case of a horizontal measurement direction, the force-measuring parts A and B are placed at the distances $L_A$ and $L_B$, respectively, on the same side of a vertical plane and through said centre of force, and wherein the force-measuring parts A and B are placed at the distances $h_A$ and $h_B$, respectively, on different sides of a plane parallel to the measurement direction and through said centre of force, and wherein one of the deflection angles $\alpha$ or $\beta$ of the web to the deflector roll relative to a horizontal plane is unknown, said method comprising calculating the tensile force based on a force $F_M$ in the measurement direction and its perpendicular force component $F_{VM}$ according to $$F_D = \frac{-(F_M^2 + F_{VM}^2)}{2(F_{VM}\cos\beta - F_M\sin\alpha)} \quad (14)$$

if the angle $\beta$ is the unknown one, or according to $$F_D = \frac{(F_M^2 + F_{VM}^2)}{2(F_{VM}\cos\beta - F_M\sin\beta)} \quad (15)$$

if the angle $\alpha$ is the unknown one.

* * * * *